Jan. 20, 1970   W. H. TROW   3,490,834
PROJECTOR FOR SELECTIVELY SHOWING SLIDES OR FILM STRIPS
Filed March 17, 1967   6 Sheets-Sheet 3

INVENTOR.
WILLIAM H. TROW
BY
Cumpston, Shaw &
Stephens
ATTORNEYS

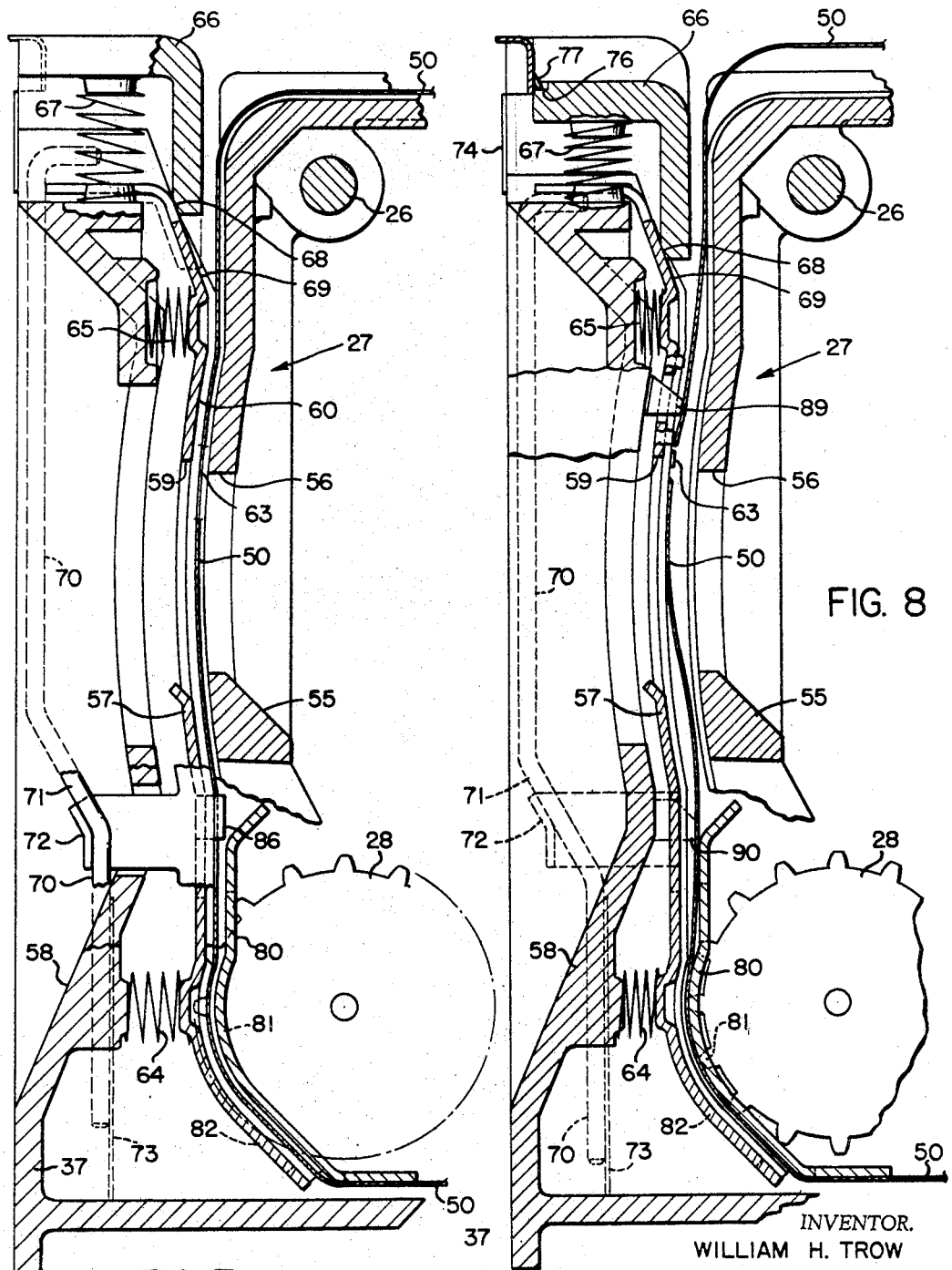

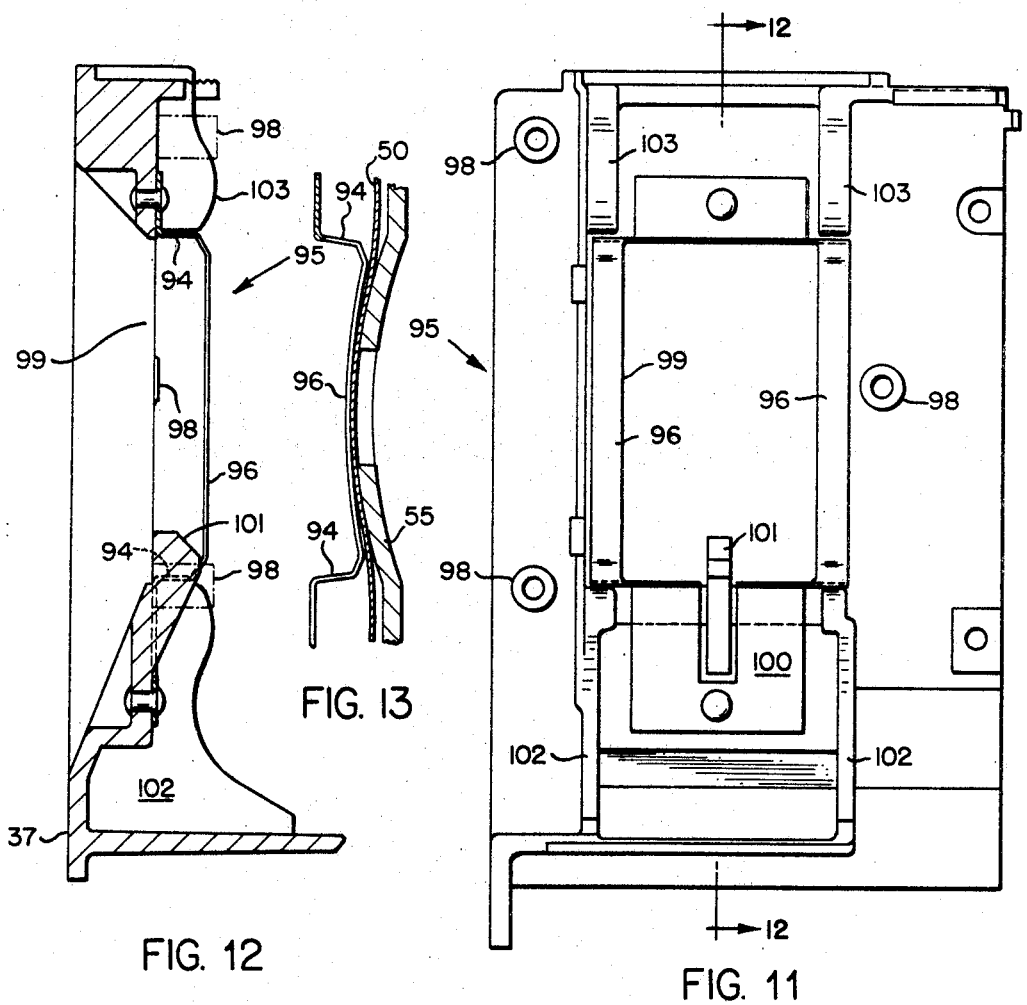

United States Patent Office 3,490,834
Patented Jan. 20, 1970

1

3,490,834
PROJECTOR FOR SELECTIVELY SHOWING SLIDES OR FILM STRIPS
William H. Trow, Perinton, N.Y., assignor to Graflex, Inc., Pittsford, N.Y., a corporation of New York
Filed Mar. 17, 1967, Ser. No. 623,959
Int. Cl. G03b *19/18, 1/48, 21/32*
U.S. Cl. 352—136                              21 Claims

ABSTRACT OF THE DISCLOSURE

A projector for selectively projecting slide transparencies or film strips has a slide holder in fixed position in front of the projection lamp. A carriage is movably mounted in front of the slide holder for movement transversely of the projection axis. The carriage supports a film strip gate, a supply and take-up for the film strip, a sprocket for driving the film strip, and a motor for driving the sprocket. When film strips are projected the light beam passes through the aperture in the slide holder to reach the film strip. When slides are projected the carriage is moved to one side.

---

This invention relates to a projector for film transparencies, and more particularly to an improved means for interchanging a projector from filmstrips to slides or vice versa. Such projectors capable of projecting images selectively from either slides or filmstrips have many uses in education, industry, government, military, sales, advertising, etc.

Previous projectors have either not provided for projection from both slides and filmstrips in the same apparatus or have been difficult or inconvenient to interchange from one film medium to another. Such difficulty and inconvenience has made prior art projectors relatively inflexible and commonly used only for either continuous filmstrip projection or slide projection without any selective interchanging between these media. Also, projection from a continuous loop filmstrip has required that the filmstrip be threaded through the gate and then its leading end spliced to its trailing end after loading. Conversely, such a filmstrip was cut when removed from the projector.

The objects of the invention include, without limitation, the following:

(a) Overcoming some of the deficiencies of prior art film transparency projectors;

(b) Making a practical and versatile projector capable of selectively projecting images from either filmstrips or slides and conveniently and readily interchanging between such film media;

(c) Providing easier loading and unloading of continuous loop filmstrips in a projector; and (d) Creating a simple, reliable, conveniently operated and economically manufactured projector that is commercially successful.

These and other objects of the invention will be apparent hereinafter from the specification which describes the invention, its use, operation, and preferred embodiments, from the drawings, which constitute a part of the disclosure, and from the subject matter claimed.

Generally, the inventive improvement in projectors is

2 accomplished by arranging a transversely slidable carriage ahead of the projector's slide holder, and mounting a filmstrip gate and appurtenant equipment such as advancing means, supply, and take-up on the carriage for movement of the filmstrip and its associated apparatus to one side of projection of images from slides, and for movement of filmstrip and its gate into a projecting position for projecting images from the filmstrip. The carriage is preferably latched in either of two positions, and a motor drive for remote control advancement of the filmstrip is possible within the spirit of the invention. To facilitate loading and unloading of the filmstrip edgewise of its gate, the entrance surfaces to the gate path are sloped inward, a spring biased pressure pad in the gate is cammed open, and stripper plates and projections are arranged for freeing the filmstrip from edge guides and the sprocket teeth for easy removal or insertion into the gate.

In the drawings:

FIG. 7 is a partially sectioned elevation view of the filmstrip gate for the illustrated projector, showing a filmstrip in place and the gate closed;

FIG. 8 is a partially sectioned elevation view of the filmstrip gate for the inventive projector showing the gate in opened position;

FIG. 11 is a front elevation of an alternative rear track;

FIG. 12 is a section view of the rear track of FIG. 11, taken along the line 12—12 thereof; and FIG. 13 is a fragmentary section view as the rear track of FIG. 12 appears in engagement with the front track, with a filmstrip in place in the gate.

Throughout the drawings, corresponding parts are identified by the same reference numerals. The invention will be described relative to the illustrated preferred embodiments, but those skilled in the art will understand that the invention can be embodied in a variety of other projectors.

Figure 1:
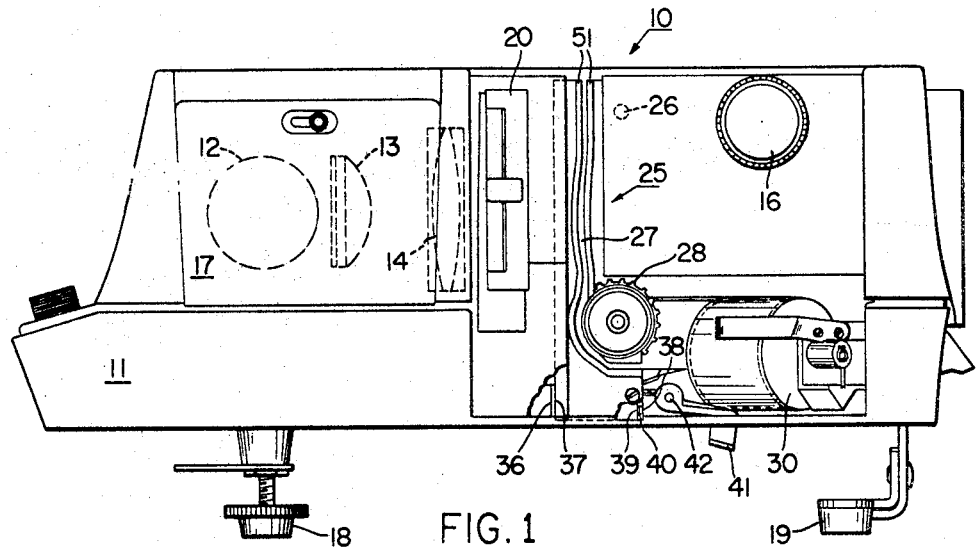
FIG. 1 is a partially cut-away side elevation of a projector embodying the invention.
Figure 2:
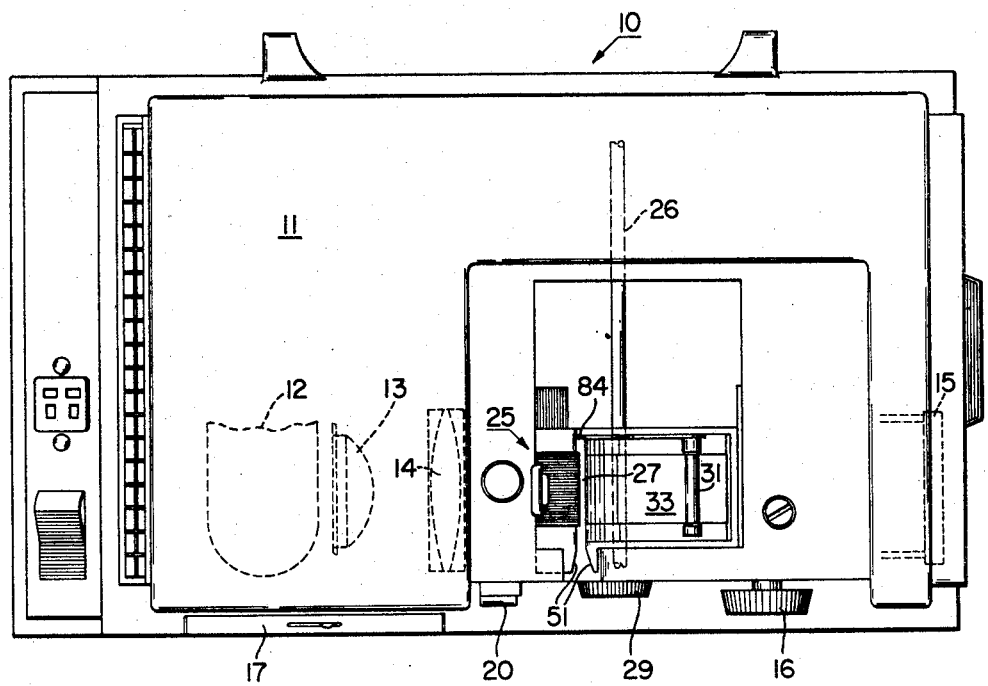
FIG. 2 is a plan view of the projector of FIG. 1 showing the filmstrip carriage positioned in the projection path of the projector.

Referring especially to FIGS. 1 and 2, projector 10 has a housing 11 containing a light source 12 and a lens system including condensor lenses 13 and 14 and lens 15 for projecting images from film transparencies. The projection lens 15 is adjusted by focus knob 16, and door 17 provides access to lamp 12. Housing 11 is supported by adjustable feet 18 and 19 and is provided with a blower (not shown), for cooling film transparencies during projection.

Projector 10 is provided with a holder 20 for projecting images of slide transparencies. Slide holder 20 is arranged on the axis of the lens system ahead of lens 14, and the conventional projection aperture in holder 20 is relatively large to accommodate present day slide transparencies, so that when holder 20 is empty, it passes a substantial cone of light.

Figure 3:
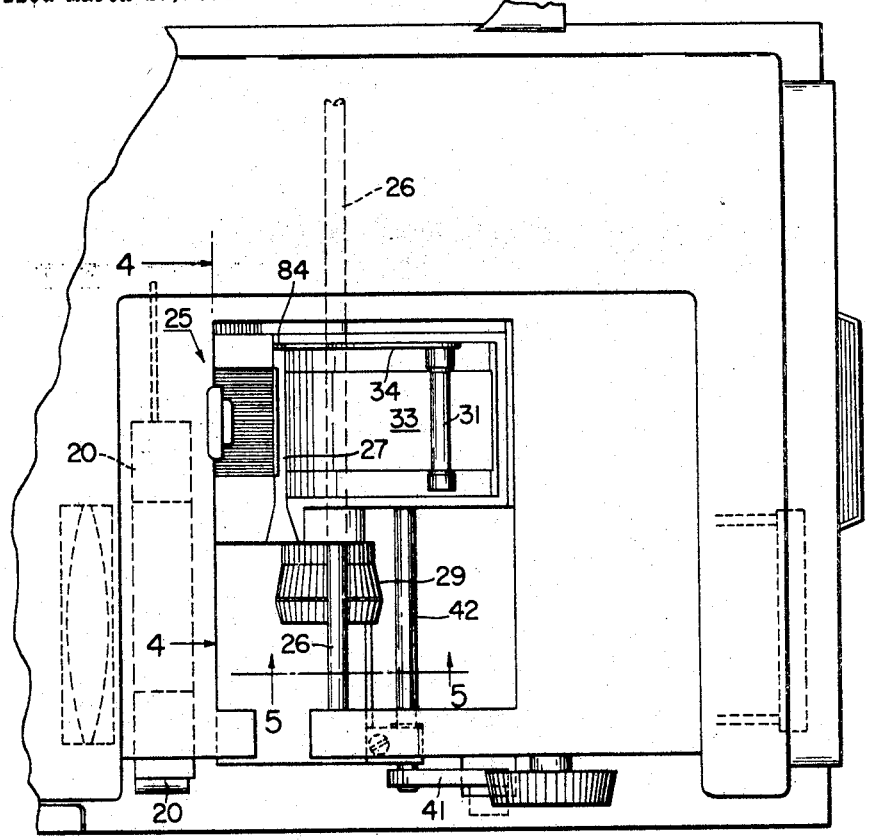
FIG. 3 is a fragmentary plan view of the projector of FIG. 1 showing the filmstrip carriage assembly outside the projection path of the projector.

Arranged ahead of slide holder 20 is a movable filmstrip carriage 25. As illustrated in FIG. 2, carriage 25 is positioned on the axis of the lens system of projector 10 directly ahead of slide holder 20 so that light passing through the projection aperture in holder 20 also passes through the filmstrip gate of carriage 25 to project images from a filmstrip. Carriage 25 is movable transversely of the lens system, and as illustrated in FIG. 3 is positioned outside the lens system to allow unobstructed projection from slides held in holder 20.

FILMSTRIP CARRIAGE

The general structure of filmstrip carriage 25 is best shown in FIGS. 1–6. Carriage 25 is mounted near its top on traverse rod 26 for sliding between the positions illustrated in FIGS. 2 and 3. Carriage 25 generally provides a film gate 27, an advancing sprocket 28, a knob 29 for manually advancing sprocket 28, a generally known film take-up device 30, and a supply coil holder 31. In addition, a drive motor 32 is arranged on carriage 25 for driving sprocket 28 to advance a filmstrip under power and by remote control. These elements of carriage 25 will be described in detail below.

The ends of traverse rod 26 are anchored in housing 11 of projector 10, and carriage 25 is provided with an aperture through which rod 26 extends. Carriage 25 fits loosely on rod 26 for sliding motion thereon.

At the top of carriage 25, recess 33 is formed under spindle 31 which is adapted for holding a hollow, spoolless, supply coil of a filmstrip. Spindle 31 is arranged on arm 34 which is pivotally mounted on traverse rod 26 and spring biased downward, to hold a filmstrip supply coil between spindle 31 and recess 33.

Film from a coil on spindle 31 is guided through gate 27 (described in more detail below) and is advanced by sprocket 28. Sprocket 28 is driven either manually by coaxial knob 29, or by motor 32 through gear 35 in a generally known way. Film advanced beyond sprocket 28 is coiled up into hollow coil in a generally known way by take-up device 30. Supply spindle 31, gate 27, motor 32, sprocket 28, and take-up device 30 are all mounted on carriage 25 for transverse movement together.

Near the bottom of carriage 25, guide rails or walls control its motion and insure accurate positioning. As best shown in the cut-away portions of FIG. 1, a forward facing rail or wall 36 on housing 11 confronts rearward-facing wall 37 on the lower rear of carriage 25. The engagement of walls 36 and 37 correctly locates the bottom of carriage 25 in any transverse position. A little forward of walls 36 and 37, a rearward-facing housing wall 38 confronts a forward-facing carriage wall 39, and a leaf spring 40 is interposed between walls 38 and 39 to bias them apart, and insure proper engagement of wall 37 with wall 36.

Figure 5:
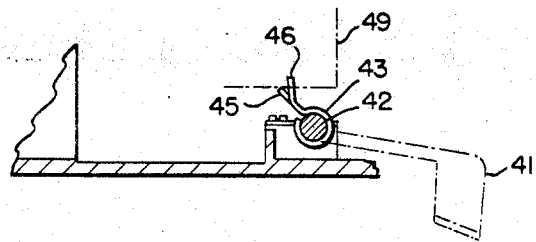
FIG. 5 shows a fragmentary section view of the inventive projector taken along the line 5—5 of FIG. 3.
Figure 6:
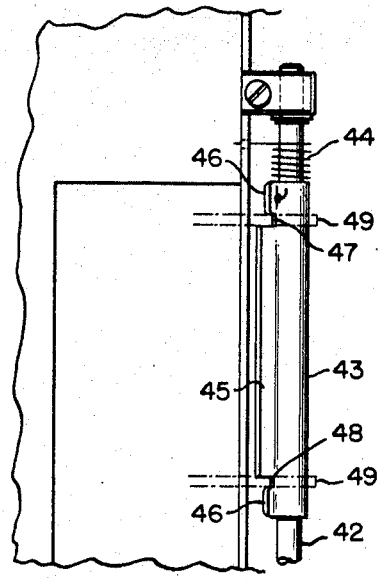
FIG. 6 is a plan view of the film carriage latch mechanism of the illustrated projector.

Preferably a latch releasably secures carriage 25 in each of the positions illustrated in FIGS. 2 and 3, and manually operable latch lever 41 is fixed on latch rod 42 for such purpose. As best shown in FIGS. 5 and 6, sleeve 43 is secured on rod 42 and biased by spring 44 toward clockwise motion as viewed in FIG. 5. Ridge 45 extends upward and rearward from sleeve 43, and ears 46 are spaced from the ends of ridge 45 to define a pair of notches 47 and 48 in sleeve 43. Ears 46 extend above ridge 45 to form end stops to limit the transverse motion of carriage 25.

Notches 47 and 48 are spaced apart by the distance between the two transverse positions of carriage 25, and notches 47 and 48 each engage the edge of a generally fore-and-aft oriented plate 49 on carriage 25, depending upon the position of carriage 25. Thus, with carriage 25 in the filmstrip projection position of FIG. 2, plate 49 is engaged in notch 48. By raising lever 41, ears 46 and ridge 45 are turned counterclockwise as viewed in FIG. 5, to free plate 49 for movement along ridge 45. Carriage 25 is then moved laterally on rod 26 until plate 29 is stopped by ear 46 adjacent notch 47. During or at the end of such motion, lever 41 is released so that plate 49 is engaged in notch 47 to latch carriage 25 in the nonprojection position of FIG. 3. Latch lever 41 is raised, and the process is reversed to move carriage 25 back to the projection position of FIG. 2.

EDGEWISE LOADING AND UNLOADING OF FILMSTRIP

A filmstrip 50 is releasably loadable and unloadable edgewise of gate 27 in the inventive projector. As best shown in FIGS. 1–3, the side of gate 27 opens outward from projector 10. Also, projector surfaces 51 are sloped or bevelled inward toward the side entrance to gate 27 to facilitate edgewise loading of filmstrip 50. The details of gate 27 that make edgewise filmstrip movement possible are best illustrated in FIGS. 7–10.

Gate 27 comprises generally a front track 55 having a projection aperture 56, a pressure pad 57 for holding filmstrip 50 against front track 55, and a rear track or support member 58 for supporting pressure pad 57. These and the other parts of gate 27 are described in greater detail below.

Front track 55 is curved in the region of projection aperture 56 and filmstrip 50 is held to the curvature of front track 55 for proper optical positioning. Light from source 12 passes along the axis of the lens system for projector 10 and through filmstrip 50 and aperture 56 in projecting images. Sprocket 28 is positioned at the bottom of front track 55 for advancing filmstrip 50 through gate 27, and filmstrip 50 enters gate 27 at the top of front track 55.

Pressure pad 57 has a projection aperture 59 registering with aperture 56 in front track 55, and pressure pad 57 is curved to conform to the curvature of front track 55. The vertically central portion of pressure pad 57 has a recess 60 set back from front track 55, so as not to bear against filmstrip 50. Conversely, the edges 61 and 62 of pressure pad 57 extend forward to hold the marginal edges of filmstrip 50 against front track 55. Spacing lugs or nipples 63 extend forward from the edges 61 and 62 of pad 57 into engagement with front track 55 outside the marginal edges of filmstrip 50 to space edges 61 and 62 from front track 55 by the thickness of filmstrip 50 and prevent undue friction on film passing through gate 27.

Support member 58 is disposed at the rear of carriage 25 for supporting pressure pad 57. Springs 64 and 65 are arranged on support member 58 and engage the rear of pressure pad 57 to urge pad 57 forward into engagement with front track 55 in the position shown in FIG. 7. Pressure pad 57 is moved rearwardly to the position of FIG. 8 for opening gate 27 by compressing springs 64 and 65. Such rearward motion of pressure pad 57 is accomplished by a manually operated cam described below.

Cam button 66 is vertically slidable on support member 58, and is biased upward to the top position by spring 67 shown in FIG. 7. Button 66 is pressed downward manually to its latched position for camming pressure pad 57 rearwardly as shown in FIG. 8. Camming of pressure pad 57 is accomplished at several points.

Figure 4:
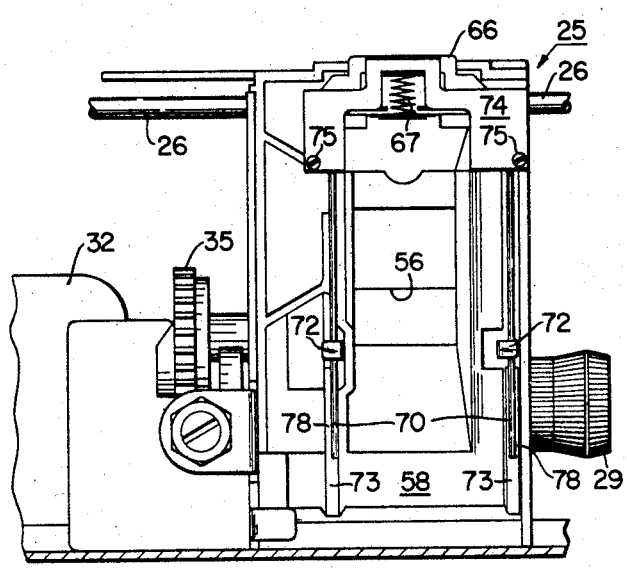
FIG. 4 shows a fragmentary section view of the inventive projector taken along the line 4—4 of FIG. 3.

Surface 68 on the lower edge of button 66 engages follower surface 69 on pressure pad 57, so that downward motion of button 66 forces the upper end of pressure pad 57 rearwardly away from front track 55. A pair of downward extensions 70, formed as heavy wires or rods leading downward from button 66, are provided with camming knees 71 that engage follower ears or arms 72 extending rearwardly from pressure pad 57. Downward motion of extensions 70 forces knees 71 into engagement with arms 72 to draw the lower part of pressure pad 57 rearwardly away from front track 55 and sprocket 28. Extensions 70 ride in grooves 78 in support member 58 as best shown in FIG. 4.

The lower ends of extensions 70 tend to be pulled forward by follower arms 72 under the bias of spring 64, and any such forward motion is preferably limited by extension support pieces 73 secured in channels 78 in support member 58 and preferably formed of metal to resist the wearing forces from movement of extensions 70.

Button 66 is preferably latched in its lowermost position as illustrated in FIG. 8 to hold open gate 27 for edgewise movement of filmstrip 50. Such latching is accomplished by button latch lever 74 secured to the back of support member 58 by screws 75. Latch lever 74 is formed of a resilient material such as steel and is biased forward toward button 66. The uppper rear central part of button 66 is recessed to form a latching shelf 76, and a latching hook 77 is bent forward from latch 74 to engage shelf 76 when button 66 is depressed to the position illustrated in FIG. 8. To release button 66 from its latched position, the top of latch lever 74 is pushed rearwardly, and button 66 rises under the bias of spring 67. At the same time springs 64 and 65 force pressure pad 57 forward against front track 55.

Filmstrip 50 must be moved over the teeth of sprocket 28 for edgewise loading and unloading according to the invention. To accomplish this, stripper plate 80 is mounted on pressure pad 57 and disposed to confront the front or forward face of filmstrip 50. Stripper plate 80 is spaced forward from pressure pad 57 by a fixed amount to allow space for filmstrip 50, and is secured to pressure pad 57 by rivets 83 that are all located along the inner edge of stripper plate 80 and pressure pad 57 to leave the outward opening edge of gate 27, at the edge 62 of pressure pad 57, free for insertion and removal of filmstrip 50. Stripper plate 80 has a pair of apertures 81 through which the teeth of sprocket 28 sweep into engagement with filmstrip 50, and corresponding apertures 82 are formed in pressure pad 57 also in registry with the teeth of sprocket 28.

When pressure pad 57 moves rearwardly to the position illustrated in FIG. 8 to open gate 27, stripper plate 80 moves rearwardly the same amount to engage the front face of filmstrip 50 and push filmstrip 50 rearwardly off the teeth of sprocket 28. With pressure pad 57 cammed fully open as shown in FIG. 8, filmstrip 50 is carried off the teeth of sprocket 28, and sprocket 28 is guarded by stripper plate 80 to insure free edgewise insertion or removal of filmstrip 50 in gate 27.

Figure 9:
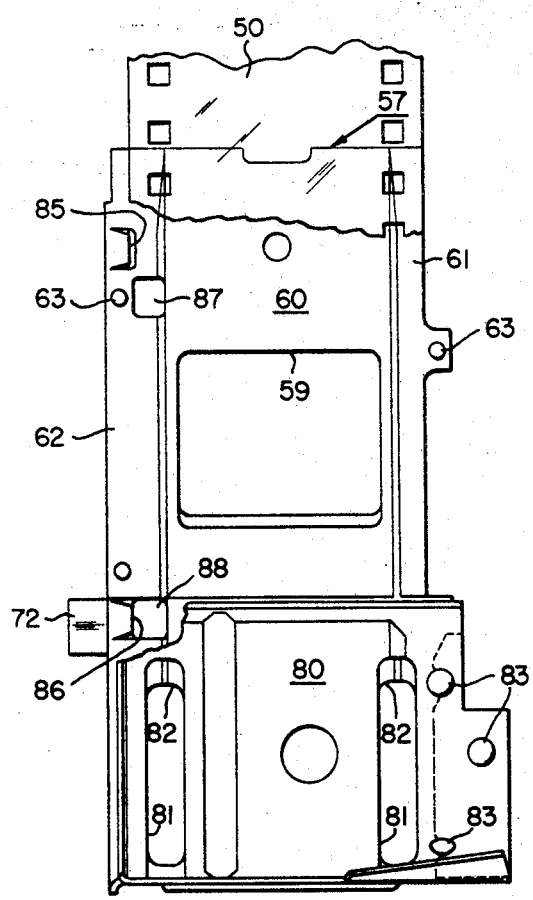
FIG. 9 is a partially cut-away front elevation of a pressure pad for the inventive projector.
Figure 10:
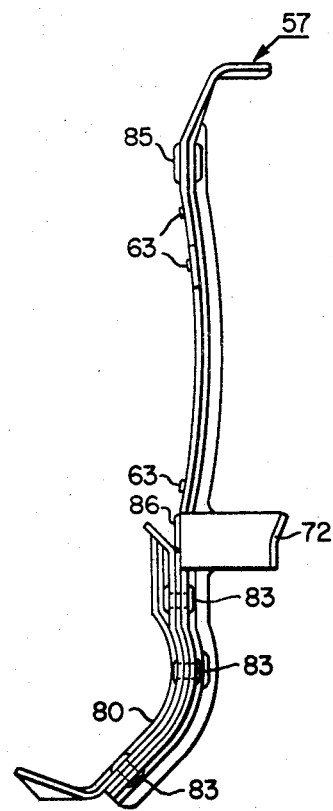
FIG. 10 is a side elevation of the pressure pad of FIG. 9.

Edge guides for filmstrip 50 are also preferably arranged in gate 27 according to the invention, and filmstrip 50 is free for insertion and removal over such edge guides, according to the invention. Inner edge guide 84 (FIGS. 2 and 3) is formed as a ridge extending rearwardly from front track 55. At the outward opening edge of gate 27 edge guides 85 and 86 as best shown in FIGS. 8 and 9, are formed to project forwardly from pressure pad 57 along open edge 62. Edge guides 85 and 86 are disposed to provide abutment surfaces against which the outer edge of filmstrip 50 rides in its travels through gate 27.

Aperture 87 is formed in the edge 63 of pressure pad 57 near edge guide 85, and aperture 88 is formed in edge 62 of pressure pad 57 adjacent edge guide 86. Apertures 87 and 88 are each spaced inwardly from edge guides 85 and 86, so as to underlie the outer marginal edge of filmstrip 50. Projections 89 and 90 extend forward from support member 58 and register respectively with apertures 87 and 88. When pressure pad 57 is cammed open to the position of FIG. 8, projections 89 and 90 extend through apertures 87 and 88 respectively and engage and force forward the outer marginal edge of filmstrip 50 to free it from edge guides 85 and 86. With gate 27 fully open, edge guides 85 and 86 are retracted behind and guarded by sloping surface 51 (FIGS. 1–3) leading to the edge of gate 27 from outside the projector. Thus, rearward movement of pressure pad 57 not only causes stripper plate 80 to free filmstrip 50 from the teeth of sprocket 28, but also removes filmstrip 50 from edge guides 85 and 86, to make it free for removal from gate 27. At the same time, camming back pressure pad 57 to open gate 27 effectively guards the teeth of sprocket 28 and edge guides 85 and 86 so that filmstrip 50 can be freely inserted edgewise into gate 27.

For circumstances in which the extra convenience of edgewise loading of filmstrip 50 in gate 27 is not desired, a less expensive alternative gate is provided for the inventive projector. Such a gate mechanism is formed by an alternative support or rear track 95 illustrated in FIGS. 11–13. Rear track 95 replaces support member 58 and pressure pad 57 and cooperates with front track 55 and sprocket 28 which remain unchanged.

Abutment bosses 98 extend forward from rear track 95 to engage front track 55 outside the margin of filmstrip 50 to space rear track 95 accurately relative to front track 55. A projection aperture 99 is formed in rear track 95 to pass projection light.

Filmstrip 50 is held in close engagement with the curvature of front track 55 by a pair of relatively narrow, spring bands 96 arranged on opposite sides of projection aperture 99 to engage the marginal edges of filmstrip 50. Spring bands 96 are preferably formed from a single piece of resilient material such as spring steel member 100.

Spring bands 96 are free to bend into conformity with the curvature of front track 95 as shown in FIG. 13, and to facilitate this freedom for bending, spring bands 96 are supported by integral, forward extending leg portions 94. Bending of spring bands 96 to the curvature of front track 95 forces support leg portions 94 inward as exaggerated in FIG. 13.

Of course, spring bands 96 can be supported in other ways to be free for bending to the curvature of front track 55. Also, spring bands can be made slightly curved for pressing into conformity with a flat front track. Either way, the light engagement of the marginal edges of filmstrip 50 by spring bands 96 holds filmstrip 50 properly in place against front track 55 for optical projection. Also, the resilience of spring bands 96 allows the increased thickness of film splices to pass through the gate without excessive drag on filmstrip 50.

A projection 101 extends upward and forward at the bottom of projection aperture 99 to prevent a filmstrip from collapsing inward away from front track 55 between spring bands 96. Projection 101 also guides the central portion of the leading edge of a filmstrip as it is pushed downward through the film gate between rear track 95 and front track 55 in threading the filmstrip.

At the lower edge of rear track 95, a pair of curved guide members 102 guide the marginal edges of a filmstrip into engagement with the teeth of sprocket 28. Guide strips 102 are separated sufficiently to be disposed axially outside the teeth of sprocket 28 for such purpose. In addition, near the top of rear track 95, a pair of guide members 103 brings the edges of a filmstrip into proper engagement with spring bands 96 in its downward path through the gate.

A filmstrip is not removable edgewise from the gate formed by rear track 95; but such a gate is very economical, and rear track 95 with its spring bands 96 occupies the same space taken by support member 58 and pressure pad 57, so as to alternate with such members without changes in carriage 25 or projector 10.

The above description shows how the objects of the invention are accomplished in the illustrated projector. Those skilled in the art will realize that the invention can be embodied in many existing projectors, and that many variations of projectors can be designed to accomplish the invention.

Other features, advantages, and other specific embodiments of this invention will be apparent to those exercising ordinary skill in the pertinent art after considering the foregoing disclosure. In this regard, while a specific preferred embodiment has been described in detail, such disclosure is intended as illustrative rather than limiting, and other embodiments, variations, and modifications can be effected within the spirit and scope of the invention as disclosed and claimed. Furthermore, the following claimed subject matter is intended to cover fully all the aspects of the disclosed invention that are unobvious over prior art, including all equivalent embodiments.

I claim:
1. In a projector having a light source and a lens system for projecting images from photographic film transparencies selectively in slide form and strip form, improved means for interchanging said forms of film transparencies, said interchanging means comprising:
   (a) a slide holder arranged in a fixed location in front of said light source;
   (b) said slide holder having a projection aperture registered with the axis of said lens system;
   (c) a movable carriage arranged on said projector in front of said slide holder;
   (d) a focusing lens arranged on said lens system axis in front of said carriage;
   (e) said carriage including:
      (1) a film strip gate;
      (2) means for holding a supply coil of said film strip;
      (3) means for taking up a coil of said film strip;
      (4) means for positioning said film strip in said gate;
      (5) a sprocket for advancing said film strip through said gate; and
      (6) a motor arranged for driving said sprocket;
   (f) guide means for supporting said carriage for motion in a linear path transverse to the axis of said lens system between a first position wherein said gate is registered with said lens system axis for projecting images from said film strip by light passing through said aperture and said focusing lens and a second position wherein said carriage is located transversely aside of said lens system to allow projecting of images from slides in said slide holder by light from said source passing through said focusing means; and
   (g) latch means arranged on said projector for releasably holding said carriage in said first and second positions.

2. The projector of claim 1 wherein said guide means comprises a traverse rod supporting said carriage for lateral sliding motion relative to said projector, a transverse wall arranged on said projector, and an abutment surface on said carriage disposed for engaging said wall to locate said carriage axially of said lens system.

3. The projector of claim 2 including a spring arranged for biasing said carriage to urge said abutment surface into engagement with said transverse wall.

4. The projector of claim 3 wherein said traverse rod is arranged in the region of the top of said carriage, and said abutment surface and said transverse wall are arranged in the region of the bottom of said carriage.

5. The projector of claim 1 wherein said gate includes a track member for supporting one face of said film strip and a pressure pad for holding the marginal edges of the opposite face of said film strip in engagement with said track member.

6. The projector of claim 5 wherein spacing lugs are arranged outside the marginal edges of said film strip for spacing said pressure pad from said track member by the thickness of said film strip.

7. The projector of claim 6 wherein said pressure pad comprises a pair of resilient bands disposed for pressing against the marginal edges of said opposite face of said film strip.

8. The projector of claim 7 wherein said track member is configured to define a curved path for said film strip in said gate, and said resilient bands are flat in unbiased condition, and are mounted for bending into conformity with said curved path.

9. The projector of claim 8 wherein leg portions integral with said resilient bands extend forward toward said track member to support said resilient bands for said bending.

10. The projector of claim 5 including a support member mounted on said carriage, and springs engaging said support member and said pressure pad to urge said pressure pad toward said track member.

11. The projector of claim 10 including means for moving said pressure pad away from said track member against the bias of said springs.

12. The projector of claim 11 wherein said pressure pad moving means comprises a manually movable cam and includes means for latching said cam in a position wherein said pressure pad is separated from said track member.

13. The projector of claim 12 wherein said cam includes a vertically movable button carried by said support means and legs extending downward from said button, said button and legs engaging said pressure pad at a plurality of locations for moving said pressure pad away from said track member.

14. The projector of claim 13 including means carried by said pressure pad and disposed in confrontation with said one face of said film strip for stripping said film strip from the teeth of said sprocket upon motion of said pressure pad away from said track member.

15. The projector of claim 5 wherein said gate is open along one edge and wherein abutment surfaces along said open edge of said gate extend from said pressure pad toward said track member for guiding the edge of said film strip.

16. The projector of claim 15 including means carried by said pressure pad and disposed in confrontation with said one face of said film strip for stripping said film strip from the teeth of said sprocket upon motion of said pressure pad away from said track member.

17. The projector of claim 16 wherein said abutment surfaces are sloped away from said track member to facilitate edgewise insertion of said film strip into said gate.

18. The projector of claim 17 wherein said pressure pad is formed to define apertures adjacent said abutment surfaces on the film strip side thereof, and projections extend from said support members through said apertures to move said film strip away from said abutment surfaces upon motion of said pressure pad away from said track member, to free said film strip for edgewise removal from said gate.

19. The projector of claim 18 including a support member mounted on said carriage, and springs engaging said support member and said pressure pad to urge said pressure pad toward said track member, and means for moving said pressure pad away from said track member against the bias of said springs.

20. The projector of claim 19 wherein said pressure pad moving means comprises a manually movable cam and includes means for latching said cam in a position wherein said pressure pad is separated from said track member.

21. The projector of claim 20 wherein said cam includes a vertically movable button carried by said support means and legs extending downward from said button, said button and legs engaging said pressure pad at a plurality of locations for moving said pressure pad away from said track member.

References Cited

UNITED STATES PATENTS

| | | | |
|---|---|---|---|
| 632,472 | 9/1899 | Roebuck et al. | 352—136 |
| 1,176,691 | 3/1916 | Ricker et al. | 353—68 |
| 1,872,353 | 8/1932 | Schulz | 352—228 X |
| 1,944,036 | 1/1934 | Proctor | 352—124 X |
| 2,228,855 | 1/1941 | Sperry | 352—224 |
| 2,229,992 | 1/1941 | Howell | 352—224 |
| 2,251,077 | 6/1941 | Stanton | 353—68 |
| 2,783,680 | 3/1957 | Goldberg | 353—68 |
| 2,995,974 | 8/1961 | Kirk | 352—224 X |

NORTON ANSHER, Primary Examiner

M. H. HAYES, Assistant Examiner

U.S. Cl. X.R.

352—224, 228; 353—68